(12) United States Patent
Shibahara

(10) Patent No.: US 11,318,570 B2
(45) Date of Patent: May 3, 2022

(54) INCLINING AND ROTATING TABLE APPARATUS

(71) Applicant: TSUDAKOMA KOGYO KABUSHIKI KAISHA, Ishikawa-ken (JP)

(72) Inventor: Masato Shibahara, Ishikawa-ken (JP)

(73) Assignee: TSUDAKOMA KOGYO KABUSHIKI KAISHA, Ishikawa-Ken (JP)

(*) Notice: Subject to any disclaimer, the term of this patent is extended or adjusted under 35 U.S.C. 154(b) by 52 days.

(21) Appl. No.: 16/884,736

(22) Filed: May 27, 2020

(65) Prior Publication Data
US 2020/0398388 A1     Dec. 24, 2020

(30) Foreign Application Priority Data

Jun. 20, 2019    (JP) .............................. JP2019-114187

(51) Int. Cl.
*B23Q 1/26*     (2006.01)

(52) U.S. Cl.
CPC ...................................... *B23Q 1/26* (2013.01)

(58) Field of Classification Search
CPC ...... B23Q 1/525; B23Q 1/5437; B23Q 16/06; B23Q 16/02; B23Q 2200/004; B23Q 2220/004
See application file for complete search history.

(56) References Cited

U.S. PATENT DOCUMENTS

| | | | |
|---|---|---|---|
| 3,700,228 A | 10/1972 | Peale | |
| 6,733,217 B2* | 5/2004 | Schworer | B23Q 1/52 269/57 |
| 2005/0212193 A1 | 9/2005 | Omori et al. | |
| 2009/0283950 A1 | 11/2009 | Bernhard et al. | |
| 2010/0294173 A1 | 11/2010 | Omori | |
| 2017/0120405 A1* | 5/2017 | Tezuka | B23Q 1/525 |

FOREIGN PATENT DOCUMENTS

| | | |
|---|---|---|
| DE | 3435982 A1 | 4/1986 |
| EP | 2113334 A1 | 11/2009 |
| JP | 2005-279803 A | 10/2005 |

OTHER PUBLICATIONS

Nov. 20, 2020, European Search Report issued for related EP Application No. 20176916.3.

* cited by examiner

*Primary Examiner* — Tyrone V Hall, Jr.
(74) *Attorney, Agent, or Firm* — Paratus Law Group, PLLC

(57) ABSTRACT

An inclining and rotating table apparatus includes a position adjusting mechanism for adjusting a position of an inclination frame with respect to a driven shaft at least in a vertical direction and provided between the driven shaft and the inclination frame, in which the driven shaft is formed in a hollow shape such that at least a part of a rotation drive motor is disposed therein, and has an attachment portion to which the inclination frame is attached and which extends in a radial direction and allows attachment of the rotation drive motor to the inclination frame, and the rotation drive motor is supported on the driven shaft via the inclination frame.

1 Claim, 2 Drawing Sheets

INCLINING AND ROTATING TABLE APPARATUS

CROSS-REFERENCE TO RELATED APPLICATIONS

The present application claims priority from Japanese Patent Application No. 2019-114187, filed Jun. 20, 2019, the entire content of which is incorporated herein by reference.

BACKGROUND OF THE INVENTION

Field of the Invention

The present invention relates to an inclining and rotating table apparatus including: a base frame installed on a machine tool; an inclination frame supported on the base frame via a pair of rotating shafts and having an inclining table at a position separated from axes of the rotating shafts; an inclination drive motor for swingingly driving the inclination frame and built in the base frame; a rotating table installed on the inclining table; and a rotation drive motor for rotationally driving the rotating table and built in the base frame, in which one of the pair of rotating shafts is an inclination drive shaft connected to the inclination drive motor, the other one thereof is a driven shaft driven to rotate with swinging drive of the inclination frame, the rotation drive motor is rotatably supported on the base frame via the driven shaft, and an output shaft of the rotation drive motor is connected to a rotary drive shaft connected to the rotating table by a driving force transmission mechanism.

Background Art

Examples of the above-described inclining and rotating table apparatus include a device disclosed in JP-A-2005-279803. In the inclining and rotating table apparatus, an inclination frame is supported on abase frame via a pair of rotating shafts. Therefore, the base frame includes portions that are located on both sides of the inclination frame and rotatably support the pair of rotating shafts. An inclination drive motor for swingingly driving the inclination frame is mounted on one (drive side portion) of both side portions of the base frame. Then, the rotating shaft (inclination drive shaft) supported on the drive side portion is rotationally driven by the inclination drive motor. Accordingly, the inclination frame is swingingly driven, and accordingly, the rotating shaft (driven shaft) supported on the other portion (driven side portion) of the base frame is driven to rotate.

Further, the rotating shaft (central shaft) is rotatably supported on the inclination frame (inclination table) via, for example, a support frame, and a rotating table is rotatably installed in a form attached to the rotating shaft. A rotation drive motor for rotationally driving the rotating table is built on the driven side portion of the base frame. Further, the inclination frame is provided with a rotary drive shaft connected to the rotating table via the rotating shaft or the like in order to rotationally drive the rotating table. An output shaft of the rotation drive motor and the rotary drive shaft are connected to each other via a driving force transmission mechanism provided in the inclination frame (mainly, an arm supporting the inclining table). Accordingly, the rotating table installed on the inclining table is rotationally driven by the rotation drive motor via the driving force transmission mechanism. A mechanism composed of a gear train or a mechanism using a pulley and a drive belt is employed as the driving force transmission mechanism.

Then, the rotation drive motor is rotatably supported on the base frame (the driven side portion) to rotate with the swinging of the inclination frame.

In detail, since the driving force transmission mechanism is provided on the inclination frame, the position of the driving force transmission mechanism changes with the swinging of the inclination frame. Therefore, when the rotation drive motor is fixedly provided, the driving force transmission mechanism attempts to rotate the rotating shaft (the rotating table) as the inclining table is swingingly driven. As a result, when the rotating table rotates, a relationship between the phase (angular position) of the output shaft of the rotation drive motor and the indexing position of the rotating table changes, which causes a problem in control. Further, when the rotating table cannot be rotated due to a clamp device or the like, an excessive load is applied to the inclination drive motor and the driving force transmission mechanism, which may cause damage. Thus, the rotation drive motor is provided to rotate with the swinging of the inclination frame.

In the inclining and rotating table apparatus disclosed in JP-A-2005-279803, in order to make the rotation drive motor rotatably supported on the driven side portion, the rotation drive motor is attached to a driven shaft rotatably supported on the driven side portion in arrangement in which the axis of the output shaft substantially coincides with the axis of the driven shaft.

SUMMARY OF THE INVENTION

By the way, although an inclining and rotating table apparatus is installed on a table surface of a machine tool, it is necessary that a positional relationship (for example, parallelism) of the upper surface (surface on which a workpiece is installed) of a rotating table with respect to the table surface accurately (strictly) satisfies a predetermined standard due to a relationship with processing accuracy. However, at a time point at which the installation on the table surface of the machine tool is completed due to an influence on transfer, an installation operation, or the like of the inclining and rotating table apparatus, the positional relationship between the upper surface of the rotating table and the table surface of the machine tool may not satisfy the standard. Thus, in this case, in the inclining and rotating table apparatus, the position of the rotating table is adjusted.

Therefore, although not disclosed in JP-A-2005-279803, the inclining and rotating table apparatus includes a position adjusting mechanism for performing the above-described position adjustment. In a general inclining and rotating table apparatus, the position adjusting mechanism is provided in a driven side portion in the base frame. Then, a position adjusting mechanism according to the related art is configured to adjust the position of the inclination frame with respect to the driven shaft between the driven shaft supported on the base frame (the driven side portion) via a bearing and the inclination frame attached to the driven shaft. Then, for example, when the parallelism as the positional relationship does not satisfy the standard, the position adjusting mechanism performs adjustment for displacing the position of the inclination frame with respect to the driven shaft in a vertical direction.

However, as a result of performing such position adjustment, a new adjustment operation (separate adjustment operation) occurs between the rotation drive motor and the driving force transmission mechanism.

In detail, as described above, in the inclining and rotating table apparatus according to the related art, the rotation drive motor is attached to the driven shaft. Meanwhile, the driving force transmission mechanism is provided on the inclination frame to be subjected to the position adjustment as described above. Therefore, when the position of the inclination frame is displaced in the vertical direction by performing the position adjustment as described above, the relative position between the rotation drive motor and the driving force transmission mechanism also changes in the vertical direction, and as a result, a connection state between the rotation drive motor (the output shaft) and the driving force transmission mechanism changes. When the driving force transmission mechanism is formed with the above-described gear train as a change of the connection state, a backlash between a gear attached to the output shaft of the rotation drive motor and a gear of the driving force transmission mechanism, which engages with the gear, changes. Further, when the driving force transmission mechanism uses a pulley and a drive belt, the tension of the drive belt will change. Then, in the former case, the backlash needs to be readjusted, and in the latter case, the tension of the drive belt needs to be readjusted, and the separate adjustment operation for such readjustment occurs.

Thus, it is an object of the present invention to provide a configuration of an inclining and rotating table apparatus that does not require the above-described separate adjustment operation even when the above-described position adjustment is performed.

In order to achieve the above object, according to the present invention, the inclining and rotating table apparatus further includes a position adjusting mechanism for adjusting a position of the inclination frame with respect to the driven shaft at least in a vertical direction and provided between the driven shaft and the inclination frame, the driven shaft is formed in a hollow shape such that at least a part of the rotation drive motor is disposed therein, and has an attachment portion to which the inclination frame is attached and which extends in a radial direction and allows attachment of the rotation drive motor to the inclination frame, and the rotation drive motor is supported on the driven shaft via the inclination frame.

Here, the phrase "formed to allow the attachment of the rotation drive motor with respect to the inclination frame" means that the attachment portion is formed such that an attachment section for attaching the rotation drive motor to the inclination frame can exist inside the attachment portion.

According to the inclining and rotating table apparatus according to the present invention, since the above-mentioned position adjustment does not cause a change of the connection state between the rotation drive motor and the driving force transmission mechanism as described above, the readjustment itself is not required. Therefore, there is no need to perform a separate adjustment operation, and the position adjustment operation can be easily performed as a whole as compared with the related art.

In detail, as described above, the rotation drive motor needs to be rotatably supported on the base frame. Then, in the inclining and rotating table apparatus according to the present invention, the rotation drive motor is not directly supported on the driven shaft as in the related art, but is supported on the driven shaft via the inclination frame attached to the driven shaft to be supported on the base frame via the driven shaft. Then, the driven shaft is formed such that the attachment portion can be provided with the attachment section for attaching the rotation drive motor to the inclination frame inside the driven shaft to enable such support. Accordingly, the above-described position adjustment is performed between the driven shaft and the inclination frame as in the related art. However, since the rotation drive motor is attached to the inclination frame, the connection state between the rotation drive motor and the driving force transmission mechanism does not change. Therefore, even when the position adjustment is performed, there is no need to perform the separate adjustment operation as described above, so that the position adjustment operation can be easily performed as a whole as compared with the related art.

DETAILED DESCRIPTION OF THE INVENTION

Figure 1:
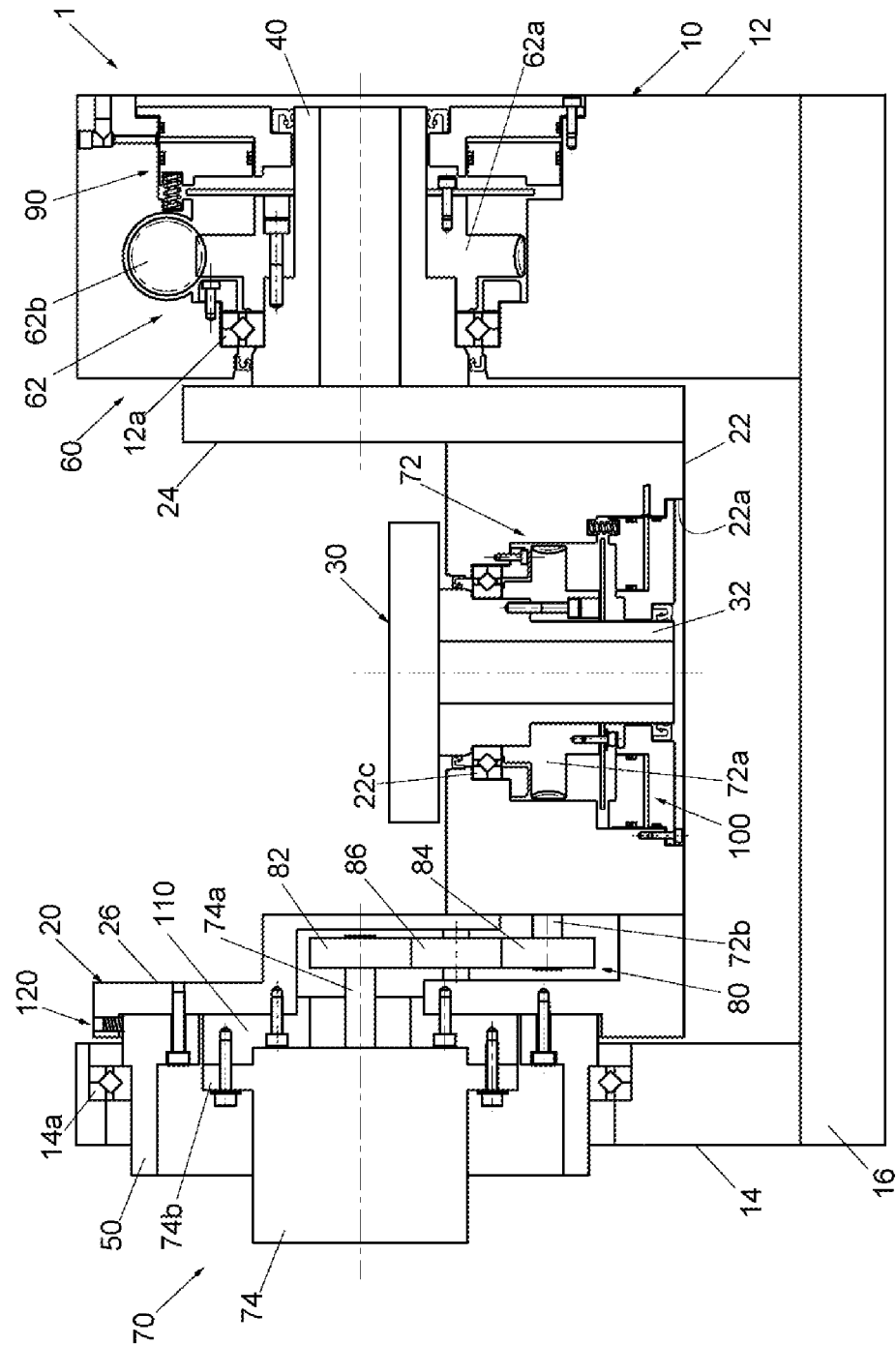
FIG. 1 is an overall view of an inclining and rotating table apparatus according to an embodiment of the present invention.
Figure 2:
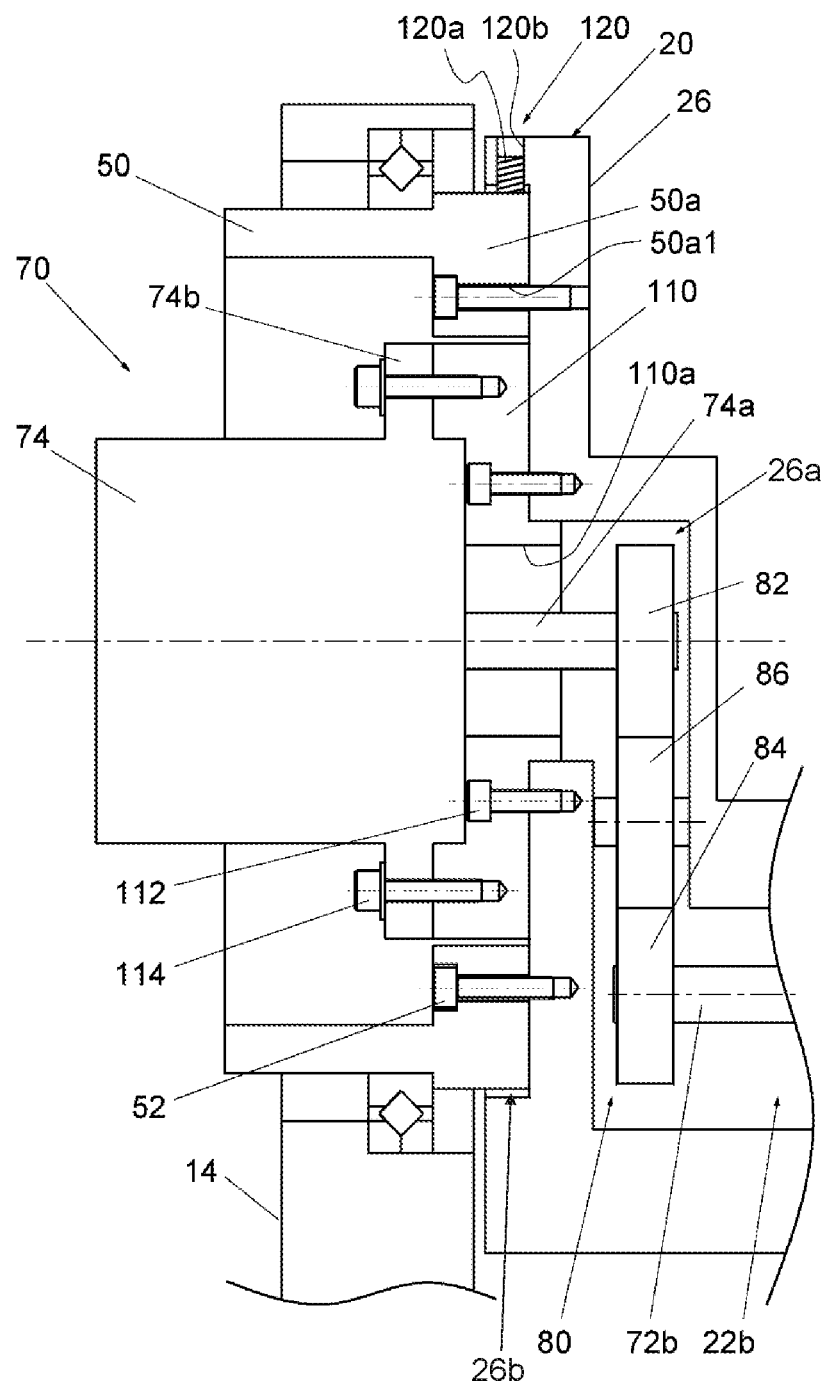
FIG. 2 is an enlarged view of a main part of the inclining and rotating table apparatus according to an embodiment of the present invention.

Hereinafter, an embodiment (example) of the inclining and rotating table apparatus to which the present invention is applied will be described with reference to FIGS. 1 and 2.

As shown, an inclining and rotating table apparatus 1 includes a base frame 10, an inclination frame 20, and a rotating table 30.

In detail, the base frame 10 includes a plate-shaped stand 16 serving as a base, and a pair of support bases 12 and 14 erected on the stand 16 while being separated from each other in the longitudinal direction (the left-right direction in FIG. 1) of the stand 16. Further, in the base frame 10, rotating shafts 40 and 50 are rotatably supported on the pair of support bases 12 and 14 via bearings 12a and 14a, respectively. That is, the inclining and rotating table apparatus 1 includes the pair of rotating shafts 40 and 50, and the rotating shafts 40 and 50 are rotatably supported on the pair of support bases 12 and 14 of the base frame 10 via the bearings 12a and 14a, respectively. Both the rotating shafts 40 and 50 are provided such that the axes thereof are parallel to the longitudinal direction of the stand 16 and such that the two axes substantially coincide with each other when viewed in the longitudinal direction of the stand 16.

Further, the inclination frame 20 is a so-called cradle-type inclination frame 20, and is configured with a plate-shaped inclining table 22 having a rectangular shape when viewed in the plate thickness direction and a pair of arm portions 24 and 26 for supporting the inclining table 22. In detail, the inclination frame 20 is configured such that the arm portions 24 and 26 are continuous with both ends of the inclining table 22 in the longitudinal direction (the left-right direction in FIG. 1) of the inclining table 22, respectively, and is configured to have a substantially U shape when viewed in a direction parallel to an end surface of the inclining table 22.

Further, in a state in which the inclination frame 20 is provided between the pair of support bases 12 and 14 (between the pair of rotating shafts 40 and 50) of the base frame 10 in parallel to the longitudinal direction of the inclining table 22 and the longitudinal direction of the stand 16, the arm portions 24 and 26 are fixed to the corresponding rotating shafts 40 and 50, so that the inclination frame 20 is supported on the base frame 10 via the pair of rotating shafts 40 and 50. The fixed positions of the arm portions 24 and 26 with respect to the rotating shafts 40 and 50 are positions separated from the inclining table 22 in the extending direction of the arm portions 24 and 26 with respect to the inclining table 22. As a result, the inclining table 22 is in a state of being disposed at a position separated from the axes of the rotating shafts 40 and 50.

Further, the rotating table 30 is a disk-shaped member, and is rotatably supported on the inclination frame 20 (the inclining table 22). In detail, a support shaft 32 is rotatably supported on the inclination frame 20 via a bearing 22*c* in a direction in which a direction of the axis coincides with the plate thickness direction of the inclining table 22. The inclining table 22 has an accommodation hole 22*a* formed at the center portion thereof to accommodate the support shaft 32, and the support shaft 32 is accommodated in the accommodation hole 22*a* and has one end provided to protrude from the upper surface of the inclining table 22. Then, the rotating table 30 is attached to one end of the support shaft 32 while the center thereof coincides with the axis of the support shaft 32. Thus, the rotating table 30 is rotatably supported on the inclining table 22.

Further, the inclining and rotating table apparatus 1 includes an inclination drive unit 60 for swingingly driving the inclination frame 20 and a rotary drive unit 70 for rotationally driving the rotating table 30.

The inclination drive unit 60 is provided to rotationally drive one rotating shaft 40 (hereinafter, also referred to as an "inclination drive shaft") among the pair of rotating shafts 40 and 50 rotatably supported within one support base 12 (hereinafter, also referred to as a "drive support base") among the pair of support bases 12 and 14 of the base frame 10. The inclination drive unit 60 includes a worm mechanism 62 connected to the inclination drive shaft 40, and an inclination drive motor (not shown) that rotationally drives the inclination drive shaft 40 via the worm mechanism 62. In the inclining and rotating table apparatus 1, the inclination drive shaft 40 is rotationally driven by the inclination drive motor, so that the inclination frame 20 is swingingly driven. Further, as the inclination frame 20 is swingingly driven, the other rotating shaft (hereinafter, also referred to as "driven shaft") 50 is driven to rotate.

The rotary drive unit 70 uses a rotation drive motor 74 as a drive source. The rotation drive motor 74 is provided inside the other support base (hereinafter, referred to as a "driven support base") 14 among the pair of support bases 12 and 14 of the base frame 10, on which the driven shaft 50 is rotatably supported. Then, in addition to the rotation drive motor 74, the rotary drive unit 70 includes a worm mechanism 72 connected to the support shaft 32 that supports the rotating table 30, and a driving force transmission mechanism 80 including a transmission gear 86 for transmitting rotation of an output shaft 74*a* of the rotation drive motor 74 to the worm mechanism 72.

In detail, the worm mechanism 72 includes a worm wheel 72*a* attached to the support shaft 32 and a worm shaft (rotary drive shaft) 72*b* to which a worm connected to the worm wheel 72*a* is attached. The rotary drive shaft 72*b* is provided to extend from the position of the worm wheel 72*a* to the inside of the arm portion (driven side arm portion) 26 fixed to the driven shaft 50. Therefore, a space 22*b* for accommodating the rotary drive shaft 72*b* provided in such a manner and communicating with the accommodation hole 22*a* is formed inside the inclining table 22.

Then, the rotary drive shaft 72*b* is connected to an output shaft (hereinafter, also simply referred to as "output shaft") 74*a* of the rotation drive motor 74 via the driving force transmission mechanism 80. Since the rotary drive shaft 72*b* is provided inside the inclining table 22 as described above, a connection position between the rotary drive shaft 72*b* and the driving force transmission mechanism 80 also swings as the inclination frame 20 is swingingly driven. In such a configuration, in order to maintain a connection state between the output shaft 74*a* and the rotary drive shaft 72*b* by the driving force transmission mechanism 80 constant, the rotation drive motor 74 is necessarily provided such that the position of the axis of the output shaft 74*a* substantially coincides with the position of a swinging center of the inclination frame 20 (the position of the axis of the driven shaft 50). Thus, the rotation drive motor 74 is provided inside the driven support base 14 such that the position of the axis of the output shaft 74*a* substantially coincides with the position of the axis of the driven shaft 50.

In detail, the driven shaft 50 is a shaft having a larger diameter than a portion of the rotation drive motor 74 having the largest outer diameter, and is a shaft formed in a hollow cylindrical shape. Further, the inner diameter of a space inside the driven shaft 50 is large enough to accommodate the rotation drive motor 74. Then, the rotation drive motor 74 is arranged such that a part thereof is located in the space inside the driven shaft 50 and the position of the axis of the output shaft 74*a* substantially coincides with the position of the axis of the driven shaft 50. However, in such a state, the rotation drive motor 74 is in a state in which the output shaft 74*a* thereof protrudes from the driven support base 14 toward the inclination frame 20 side.

Further, because of the positional relationship between the rotation drive motor 74 provided in this manner and the rotary drive shaft 72*b* provided in the inclining table 22, the output shaft 74*a* and the rotary drive shaft 72*b* are arranged to be vertically separated from each other. The output shaft 74*a* and the rotary drive shaft 72*b* arranged as described above are connected to each other through the driving force transmission mechanism 80 as described above.

In detail, the output shaft 74*a* of the rotation drive motor 74 protrudes from the driven support base 14 toward the inclination frame 20 side as described above, and the rotary drive shaft 72*b* also extends from the inclining table 22 toward the driven side arm portion 26 as described above. Therefore, the driven side arm portion 26 has a space portion 26*a* formed therein to allow such arrangement of the shafts 72*b* and 74*a*. The tip ends of the output shaft 74*a* and the rotary drive shaft 72*b* are located inside the space portion 26*a*. Then, a drive gear 82 is fixed to the output shaft 74*a*, a driven gear 84 is fixed to the rotary drive shaft 72*b*, and the drive gear 82 and the driven gear 84 are connected to each other through the one or more transmission gears 86 provided inside the space portion 26*a*. A gear train including the drive gear 82, the driven gear 84, and the transmission gears 86 corresponds to the driving force transmission mechanism 80.

The inclination drive unit 60 and the rotary drive unit 70 include clamping mechanisms 90 and 100 for stopping rotation of shafts 62*b* and 72*b* to which worm wheels 62*a* and 72*a* are attached, respectively, and are configured to prevent the swinging of the inclination frame 20 and the rotation of the rotating table 30 when the inclination drive unit 60 and the rotary drive unit 70 are not driven, respectively. By the way, in the illustrated example, the clamping mechanisms 90 and 100 are so-called disc-type clamping mechanisms, but may be of another type (for example, a sleeve-type clamping mechanism).

Further, the output shaft 74*a* and the rotary drive shaft 72*b* are connected to each other by the driving force transmission mechanism 80 including the gear train as described above. However, when the inclination frame 20 is swingingly driven in a state in which the rotation of the rotating table 30 is prevented by the clamping mechanism 100, as the driving force transmission mechanism 80 built in the driven side arm portion 26 swings, the output shaft 74a of the rotation drive motor 74 rotates, and a relationship between the rotation phase of the output shaft 74a of the rotation drive motor 74 and the indexing position of the rotating table 30 changes. Thus, in order to prevent the rotation phase of the output shaft 74a in the rotation drive motor 74 from changing due to the rotation of the rotation drive motor 74 itself according to the swinging of the inclination frame 20, the rotation drive motor 74 is rotatably supported on the driven support base 14.

In the support (fixation) of the inclination frame 20 (the driven side arm portion 26) with respect to the driven shaft (rotating shaft) 50, the driven side arm portion 26 in the illustrated example has a circular groove portion 26b formed therein to be open to a side surface (an end surface facing the driven support base 14). The groove portion 26b has an inner diameter slightly larger than the outer diameter of the driven shaft 50. Then, the inclination frame 20 is fixed to the driven shaft 50 in a state in which an end surface of the driven shaft 50 abuts on the bottom surface of the groove portion 26b and one end of the driven shaft 50 is located (received) in the groove portion 26b.

Further, as for the fixation, the driven shaft 50 has an attachment portion 50a formed at the one end portion thereof to extend in a radial direction inside the space described above. The end surface of the attachment portion 50a on the inclination frame side is also the end surface of the driven shaft 50, and abuts on the bottom surface of the groove portion 26b of the driven side arm portion 26. Further, the attachment portion 50a has a plurality of insertion holes 50a1 penetrated in parallel with the axial direction of the driven shaft 50 at predetermined intervals in a circumferential direction. Then, in a state in which the one end of the driven shaft 50 is received in the groove portion 26b of the driven side arm portion 26 as described above, as an attachment bolt 52 inserted into each insertion hole 50a1 of the attachment portion 50a is screw-inserted into the driven side arm portion 26, the driven side arm portion 26 (the inclination frame 20) is fixed to the driven shaft 50.

Then, the rotation drive motor 74 is attached to the inclination frame 20 through a motor bracket 110. In detail, the inclining and rotating table apparatus 1 has the motor bracket 110 for attaching the rotation drive motor 74 to the inclination frame 20. The motor bracket 110 is a disk-shaped member having a through-hole 110a penetrated in the plate thickness direction. Further, the rotation drive motor 74 has a flange portion 74b for attaching the rotation drive motor 74 itself to the motor bracket 110. Further, a plurality of through-holes through which attachment bolts 114 for attaching the rotation drive motor 74 to the motor bracket 110 are inserted are also formed in the flange portion 74b at predetermined intervals in the circumferential direction. The motor bracket 110 and the flange portion 74b of the rotation drive motor 74 are formed such that the outer diameters thereof substantially coincide with each other.

Further, in a relationship between the attachment portion 50a of the driven shaft 50 and the motor bracket 110, the attachment portion 50a is formed such that the inner diameter thereof is slightly larger than the outer diameter of the motor bracket 110. That is, the attachment portion 50a is large enough to allow the motor bracket 110 to be disposed inside the attachment portion 50a. In other words, the attachment portion 50a is large enough to allow the attachment of the motor bracket 110 to the driven side arm portion 26 in a state in which the driven side arm portion 26 is fixed to the driven shaft 50 as described above. By the way, in the illustrated example, the attachment portion 50a and the motor bracket 110 are formed such that the dimension of the attachment portion 50a of the driven shaft 50 in an axial direction and the plate thickness dimension of the motor bracket 110 substantially coincide with each other.

Then, when the rotation drive motor 74 is attached to the inclination frame 20 (the driven side arm portion 26), first, the motor bracket 110 is attached to the driven side arm portion 26 fixed to the driven shaft 50. The attachment is performed by screw-inserting, into the driven side arm portion 26, a plurality of attachment bolts 112 inserted through through-holes formed in the motor bracket 110 on the inner side in the radial direction from a portion of the motor bracket 110 corresponding to the flange portion 74b of the rotation drive motor 74. Accordingly, the motor bracket 110 is located inside the attachment portion 50a of the driven shaft 50 and has a gap formed between the motor bracket 110 and the inner peripheral surface of the attachment portion 50a.

Then, the rotation drive motor 74 is attached to the motor bracket 110. The attachment is performed by screw-inserting, into the motor bracket 110, the attachment bolts 114 inserted through the through-holes formed in the flange portion 74b. Then, in this attached state, the output shaft 74a of the rotation drive motor 74 passes through the through-hole 110a of the motor bracket 110, and the tip end of the output shaft 74a is located in the space portion 26a inside the driven side arm portion 26.

In this way, the rotation drive motor 74 is attached to the inclination frame 20 via the motor bracket 110, and is in a state in which the rotation drive motor 74 is supported via the inclination frame 20 on the driven shaft 50 rotatably supported on the driven support base 14. Accordingly, since the rotation drive motor 74 is provided such that the position of the axis of the output shaft 74a substantially coincides with the position of the axis of the driven shaft 50 as described above, the rotation drive motor 74 rotates about the axis of the driven shaft 50 according to the swinging of the inclination frame 20.

Further, the inclining and rotating table apparatus 1 of the present invention is configured such that the position of the driven side arm portion 26 with respect to the driven shaft 50 in the inclination frame 20 supported between the pair of rotating shafts (the inclination drive shaft and the driven shaft) 40 and 50 can be adjusted at least in a vertical direction. Then, the inclining and rotating table apparatus 1 of the present embodiment includes a position adjusting mechanism 120 for adjusting the position of the inclination frame 20 with respect to the driven shaft 50 in the vertical direction. That is, the inclining and rotating table apparatus 1 of the present embodiment includes the position adjusting mechanism 120 that can adjust the parallelism of the upper surface of the rotating table 30 with respect to the table surface of the installed machine tool (hereinafter, also simply referred to as "parallelism").

The position adjusting mechanism 120 includes a female screw hole 120b formed in the driven side arm portion 26 and an adjustment screw (for example, a set screw, a bolt, or the like) 120a screw-inserted into the female screw hole 120b. In detail, the driven side arm portion 26 is formed with the female screw hole 120b that is opened at a position at an upper end in a state in which the extension direction of the driven side arm portion 26 coincides with the vertical direction. The female screw hole 120b is formed within an existence range of the groove portion 26b in the plate thickness direction of the driven side arm portion 26, and is formed to penetrate the driven side arm portion 26 toward the groove portion 26b in parallel with the extending direction. Then, the adjustment screw 120a is screw-inserted into the female screw hole 120b. The adjustment screw 120a has a tip end protruding into the groove portion 26b, and is in a state in which the surface of the tip end surface abuts on the outer peripheral surface of the driven shaft 50.

The adjustment by the position adjusting mechanism 120 is performed, for example, when the parallelism does not satisfy a predetermined standard at a time point when the inclining and rotating table apparatus 1 is completely installed on the table surface of the machine tool. Then, the adjustment of the parallelism is performed by changing the amount of protrusion of the tip end of the adjustment screw 120a protruding from the female screw hole 120b as described above.

In more detail, in the adjustment, first, the attachment bolt 52 is operated to loosen a state (fastened state) in which the driven shaft 50 and the driven side arm portion 26 are fastened and fixed to each other through the attachment bolt 52. Each of the insertion holes 50a1 of the attachment portion 50a has an inner diameter that is larger than the diameter of a shaft portion of the attachment bolt 52. Then, in a state in which the driven side arm portion 26 is fixed to the driven shaft 50, a space is formed between the insertion hole 50a1 and the shaft portion of the attachment bolt 52 in an initial state. Therefore, when the fastened state is loosened as described above, the driven side arm portion 26 (the inclination frame 20) can be displaced with respect to the driven shaft 50 by the space.

Then, when the fastened state is loosened as described above, the driven side arm portion 26 is in a state of being displaced downward by an own weight thereof. However, the adjustment screw 120a screw-inserted into the female screw hole 120b formed in the driven side arm portion 26 is in contact with the outer peripheral surface of the driven shaft 50 in a tip end surface thereof, so that the adjustment screw 120a is supported on the driven shaft 50. Therefore, even when the fastened state is loosened as described above, the driven side arm portion 26 (the inclination frame 20) is not immediately displaced.

Then, the position of the driven side arm portion 26 with respect to the driven shaft 50 is adjusted in the vertical direction according to the direction and the degree of inclination of the upper surface of the rotating table 30 with respect to the table surface of the machine tool. Accordingly, the position adjustment is performed in a state in which the parallelism satisfies the above standard.

In detail, when the position of the driven side arm portion 26 with respect to the driven shaft 50 is adjusted to a higher position in the vertical direction, the adjustment screw 120a is rotated in a direction in which the protrusion amount increases. Accordingly, since the tip end of the adjustment screw 120a is in a state of abutting on the outer peripheral surface of the driven shaft 50 as described above, the driven side arm portion 26 is displaced upward as the protrusion amount increases. Meanwhile, when the position of the driven side arm portion 26 with respect to the driven shaft 50 is adjusted to a lower position in the vertical direction, the adjustment screw 120a is rotated in a direction in which the protrusion amount decreases. Accordingly, the driven side arm portion 26 is displaced downward as the protrusion amount decreases.

Then, after the position of the driven side arm portion 26 is adjusted in the vertical direction such that the parallelism satisfies the standard, the driven shaft 50 and the driven side arm portion 26 are fastened and fixed to each other again through the attachment bolt 52, so that the adjustment operation is completed.

According to the inclining and rotating table apparatus 1 of the present embodiment as described above, since the rotation drive motor 74 is supported on the inclination frame 20 (the driven side arm portion 26) via the motor bracket 110, when the position of the driven side arm portion 26 is adjusted in the vertical direction as described above, accordingly, the rotation drive motor 74 is also displaced in the vertical direction together with the driven side arm portion 26. Accordingly, the change of a relative position between the rotation drive motor 74 and the driven side arm portion 26 due to the position adjustment as described above does not occur. Furthermore, since a connection state of the gear train in the driving force transmission mechanism 80 including the drive gear 82 provided in the space portion 26a and fixed to the output shaft 74a of the rotation drive motor 74 does not change, it is not necessary to perform a separate adjustment operation according to the change in the connection state of the gear train according to the related art, and the adjustment operation can be easily performed as a whole.

Hereinabove, one embodiment (hereinafter, referred to as "the embodiment") of the inclining and rotating table apparatus to which the present invention is applied has been described. However, the present invention is not limited to those that have been described in the embodiment. However, another embodiment (modification) as described below can be implemented.

(1) In the inclining and rotating table apparatus to which the present invention is applied, in the inclining and rotating table apparatus 1 of the embodiment, the driving force transmission mechanism 80 is configured with a gear train including the drive gear 82, the driven gear 84, and the transmission gear 86. However, the present invention can be applied to an inclining and rotating table apparatus in which the driving force transmission mechanism is configured to connect a drive pulley fixed to the output shaft of the rotation drive motor and a driven pulley fixed to the rotary drive shaft to each other by a drive belt.

(2) In the position adjusting mechanism for adjusting the position (performing position adjustment) of the inclination frame with respect to the driven shaft, in the embodiment, the position adjusting mechanism 120 is configured to adjust the position only in the vertical direction. However, in the present invention, the position adjusting mechanism is not limited to a configuration in which the position adjustment can be performed only in the vertical direction, but may have a configuration in which the position adjustment is performed in a front-rear direction of the inclining and rotating table apparatus 1 (in a direction perpendicular to a paper surface in FIG. 1) in addition to the vertical direction. The position adjustment in the front-rear direction is performed such that a deviation of the center position of the rotating table 30 with respect to the axes of both the rotating shafts 40 and 50 in the front-rear direction satisfies a predetermined standard.

A configuration for performing such position adjustment in the front-rear direction is, for example, a combination of the female screw hole and the adjustment screw, which is like the configuration for the position adjustment in the vertical direction in the embodiment. In detail, the female screw hole is opened on each of a front surface and a rear surface of the driven side arm portion in a state in which the extending direction of the driven side arm portion coincides with the vertical direction, and is formed in a shape that is penetrated in a horizontal direction. However, in the initial state, each of the female screw holes is formed to penetrate the driven side arm portion toward the groove portion at a position coinciding with the position of the axis of the driven shaft 50 when viewed in the penetration direction. Then, the adjustment screw is screw-inserted into the female screw hole, and the tip end surface of the adjustment screw abuts on the outer peripheral surface of the driven shaft 50.

In the position adjusting mechanism having such a configuration, when the position adjustment in the front-rear direction is performed, first, similarly to the adjustment of the parallelism, the fastened state by the attachment bolt 52 is loosened. Then, in the front-rear direction, the adjustment screw located on a side where the center of the rotating table 30 is to be displaced is rotated in a direction in which the projection amount is reduced, and an adjustment screw located on an opposite side to the adjustment screw is rotated in a direction in which the protrusion amount increases, so that the position of the center of the rotating table 30 is adjusted. Then, after the position of the center of the rotating table 30 is adjusted such that the deviation of the position satisfies the standard, the driven shaft 50 and the driven side arm portion 26 are fastened and fixed to each other again, so that the position adjustment is completed.

(3) In the attachment configuration of the rotation drive motor with respect to the inclination frame, in the embodiment, the rotation drive motor 74 is located inside the attachment portion 50*a* of the driven shaft 50, and is attached to the inclination frame 20 (the driven side arm portion 26) via the motor bracket 110 attached to the inclination frame 20. However, the present invention is not limited to such a configuration in which the rotation drive motor is indirectly attached to the inclination frame via the motor bracket, but a configuration may be employed in which the rotation drive motor is directly attached to the inclination frame.

In this case, the rotation drive motor is configured such that the end surface of the flange portion on the output shaft side can abut on the end surface of the inclination frame 20 (the driven side arm portion 26) on the driven shaft side, and is attached to the driven side arm portion 26 by the plurality of attachment bolts inserted through the through-holes of the flange portion. In this case, since the positions of the flange portion of the rotation drive motor and the attachment portion of the driven shaft overlap each other in the axial direction of the driven shaft, the attachment portion of the driven shaft is formed such that the inner diameter thereof is slightly larger than the outer diameter of the flange portion of the rotation drive motor. That is, the attachment portion is formed in a size that allows the rotation drive motor (the flange portion) to be disposed inside the attachment portion. In other words, the attachment portion is formed in a size that allows attachment of the rotation drive motor to the inclination frame 20 in a state in which the inclination frame 20 is fixed to the driven shaft.

Further, the present invention is not limited to the embodiment, and can be variously modified without departing from the gist of the present invention.

What is claimed is:

1. An inclining and rotating table apparatus comprising:
a base frame installed on a machine tool;
an inclination frame supported on the base frame via a pair of rotating shafts and having an inclining table at a position separated from axes of the rotating shafts;
an inclination drive motor for swingingly driving the inclination frame and built in the base frame;
a rotating table installed on the inclining table; and
a rotation drive motor for rotationally driving the rotating table and built in the base frame, wherein
one of the pair of rotating shafts is an inclination drive shaft connected to the inclination drive motor, and the other one thereof is a driven shaft driven to rotate with swinging drive of the inclination frame,
the rotation drive motor is rotatably supported on the base frame via the driven shaft, and an output shaft of the rotation drive motor is connected to a rotary drive shaft connected to the rotating table by a driving force transmission mechanism,
the inclining and rotating table apparatus further comprises:
a position adjusting mechanism for adjusting a position of the inclination frame with respect to the driven shaft at least in a vertical direction and provided between the driven shaft and the inclination frame,
the driven shaft is formed in a hollow shape such that at least a part of the rotation drive motor is disposed therein, and has an attachment portion to which the inclination frame is attached and which extends in a radial direction and allows attachment of the rotation drive motor to the inclination frame, and
the rotation drive motor is supported on the driven shaft via the inclination frame.

* * * * *